US011273471B2

(12) United States Patent
Lara

(10) Patent No.: US 11,273,471 B2
(45) Date of Patent: Mar. 15, 2022

(54) SHELL EGG PASTEURIZER WITH AUTOMATED CLEAN-IN-PLACE SYSTEM

(71) Applicant: National Pasteurized Eggs, Inc., Lansing, IL (US)

(72) Inventor: Hector Gregorio Lara, Plainfield, IL (US)

(73) Assignee: Michael Foods, Inc., Minnetonka, MN (US)

( * ) Notice: Subject to any disclaimer, the term of this patent is extended or adjusted under 35 U.S.C. 154(b) by 862 days.

(21) Appl. No.: 16/121,773

(22) Filed: Sep. 5, 2018

(65) Prior Publication Data

US 2019/0000097 A1    Jan. 3, 2019

Related U.S. Application Data

(62) Division of application No. 15/153,956, filed on May 13, 2016, now Pat. No. 10,123,546.

(60) Provisional application No. 62/161,929, filed on May 15, 2015.

(51) Int. Cl.
| | |
|---|---|
| *B08B 9/08* | (2006.01) |
| *A23B 5/20* | (2006.01) |
| *A23B 5/005* | (2006.01) |
| *A23B 5/18* | (2006.01) |
| *A23L 3/00* | (2006.01) |
| *B08B 3/10* | (2006.01) |

(Continued)

(52) U.S. Cl.
CPC .............. *B08B 9/08* (2013.01); *A23B 5/0052* (2013.01); *A23B 5/18* (2013.01); *A23B 5/20* (2013.01); *A23L 3/001* (2013.01); *A23L 3/003* (2013.01); *B08B 3/02* (2013.01); *B08B 3/10* (2013.01); *B08B 3/102* (2013.01); *A23V 2002/00* (2013.01); *B08B 9/093* (2013.01)

(58) Field of Classification Search
None
See application file for complete search history.

(56) References Cited

U.S. PATENT DOCUMENTS

| | | | |
|---|---|---|---|
| 3,583,923 | A | 6/1971 | Cantrell et al. |
| 4,935,065 | A | 6/1990 | Bull |
| 4,992,195 | A | 2/1991 | Dolan et al. |

(Continued)

FOREIGN PATENT DOCUMENTS

| | | |
|---|---|---|
| CN | 102605589 | 7/2012 |
| CN | 204093758 | 1/2015 |

OTHER PUBLICATIONS

Vessel Cleaning, Spraying Systems Co., www.spray.com/literature_pdfs/B629_Vessel_Cleaning.pdf, pp. 54-71, website visited Aug. 24, 2016.

(Continued)

*Primary Examiner* — Mikhail Kornakov
*Assistant Examiner* — Ryan L Coleman

(57) ABSTRACT

An in-line shell egg pasteurizer has a clean-in-place system. Empty shell egg carriers are placed in the water bath for multiple cleaning cycles. The cleaning solution level is lowered to expose the shell egg carriers and the top parts of the water bath walls. An air perturbation is used to agitate cleaning solution held in the bottom of the water bath and clean heating coils and other components located in the bottom of the water bath. Sprayers (e.g., nozzles, cleaning spray balls, etc. . . . ) mounted on a hood over the water bath clean the top parts of the water bath walls and the empty shell egg carriers placed in the water bath.

5 Claims, 12 Drawing Sheets

(51) Int. Cl.
*B08B 3/02* (2006.01)
*B08B 9/093* (2006.01)

(56) References Cited

U.S. PATENT DOCUMENTS

| | | |
|---|---|---|
| 5,064,561 A | 11/1991 | Rouillard |
| 5,266,338 A | 11/1993 | Cascione et al. |
| 5,392,797 A | 2/1995 | Welch |
| 6,113,961 A | 9/2000 | Polster |
| 6,767,408 B2 | 7/2004 | Kenowski et al. |
| 9,289,002 B2 | 3/2016 | Lara |
| 2006/0289450 A1 | 12/2006 | Craghead |
| 2011/0017234 A1 | 1/2011 | Lehmann |
| 2011/0197920 A1 | 8/2011 | Kenowski et al. |
| 2011/0300023 A1 | 12/2011 | Cox et al. |
| 2012/0291818 A1 | 11/2012 | Monsrud et al. |

OTHER PUBLICATIONS

Potato Chip Fryer, Heat and Control, http://www.heatandcontrol.com/product.asp?pid=3; website visited Aug. 24, 2016.
TankJet Tank Cleaning Products, Spraying Systems Co.; www.tankjet.com, website visited Aug. 24, 2016.
Stier, et al., Top Tips to Make Your CIP and COP Systems Work For You, Food Safety Magazine, http://www.foodsafetymagazine.com/magazine-archive1/; website visited Aug. 24, 2016.
Unitized Vacuum Fryer, Heat and Control, www.heatandcontrol.com/PDF-list/Unitized_Vaccuum_Fryer.pdf, westite visited Aug. 24, 2016.

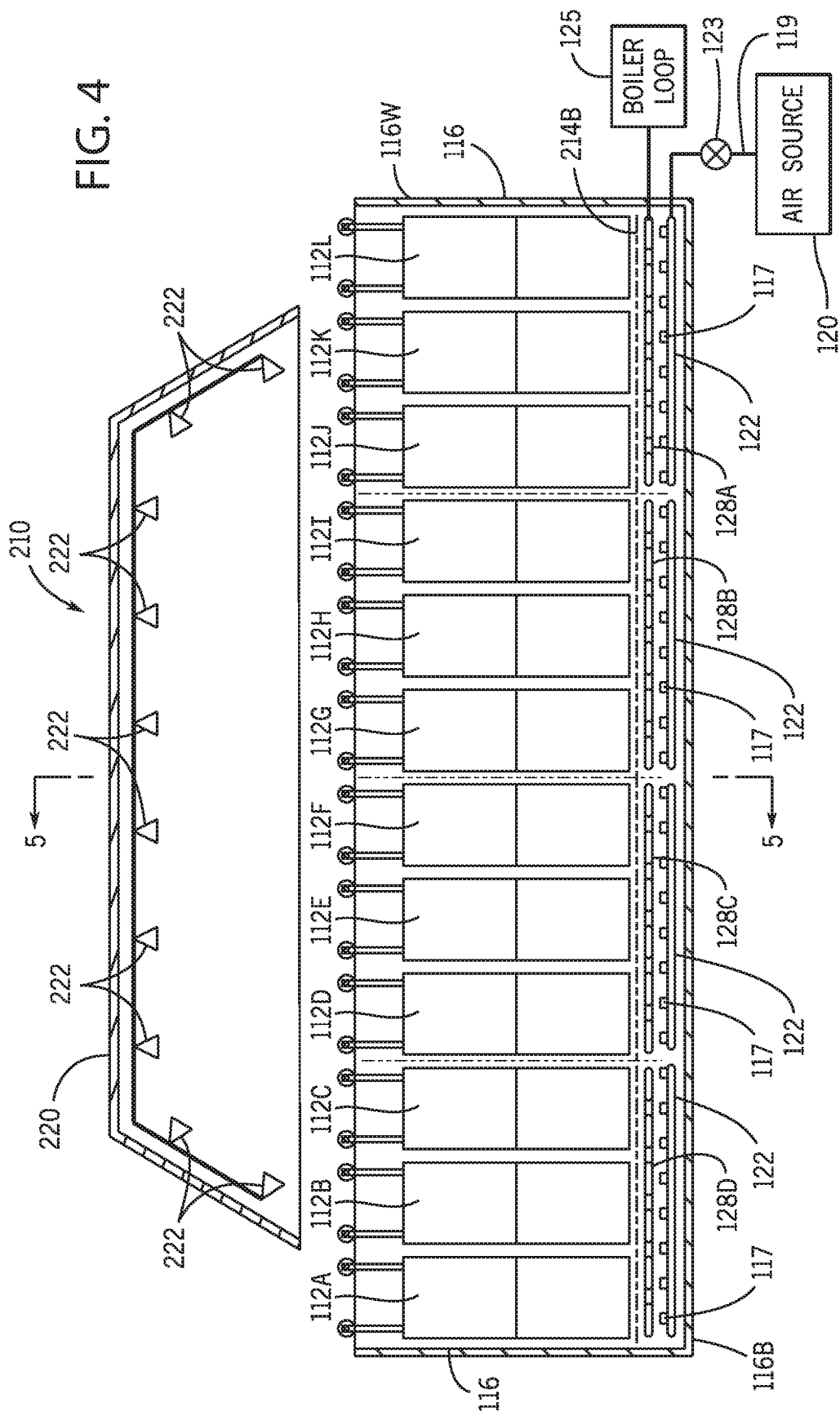

SHELL EGG PASTEURIZER WITH AUTOMATED CLEAN-IN-PLACE SYSTEM

CROSS REFERENCE TO RELATED APPLICATIONS

This application is a divisional application of U.S. patent application Ser. No. 15/153,956, filed on May 13, 2016, which application claims priority to U.S. Provisional Patent Application 62/161,929 filed May 15, 2015.

FIELD OF THE INVENTION

The invention pertains generally to shell egg pasteurization systems having a heated water bath. More specifically, the invention pertains to an automated, clean-in-place system for an in-line water bath, shell egg pasteurizer, and methods for operating such a system.

BACKGROUND OF THE INVENTION

The regulated standard set by the FDA (Food and Drug Administration) and WHO (World Health Organization) for pasteurizing an in-shell chicken egg is a 5 log reduction of *Salmonella* Enteritidis. Currently, the most commercially effective way to pasteurize shell eggs is to use an in-line water bath process to heat the shell eggs. The in-line process must sufficiently heat the entire egg, including the center of the yolk, for a sufficient amount of time to meet or exceed the 5 log reduction standard. For commercial reasons, it is important that the 5 log reduction is accomplished without overcooking the eggs. In some in-line commercial systems, a series of carriers are loaded with stacks of eggs and then sequentially submerged in and moved through the water bath according to predetermined pasteurization protocols selected for the size and start temperature of the eggs being pasteurized. Pressurized air is also supplied into the water bath to perturbate or agitate the water around and throughout the stacks of eggs, and to facilitate uniform heating of the eggs throughout the stacks. FIG. 1 shows a typical carrier 112.

Each batch of eggs brings with it the possibility of fluctuating thermal loads even if the eggs are tempered to a constant start temperature, such as 65° F. The system described in U.S. Pat. No. 9,289,002 entitled "Shell Egg Pasteurization Method" by Hector Gregorio Lara, issued on Mar. 2, 2016 therefore uses multiple individually controlled heating elements to accurately maintain the water bath temperature at the selected temperature set point. The heating system also includes several temperature sensors (e.g. RTDs) placed in the vicinity of the individual heating elements, as well as temperature sensors located higher in the water bath along its wall. PID (proportional-integral-derivative) controllers aggressively heat the water bath to the selected temperature set point, and a separate PID-controlled cooling system predicts the onset of unwanted temperature spikes and activates to prevent any unwanted temperature spikes. Water bath temperatures are actively monitored and recorded for each batch of pasteurized eggs. Data is reviewable remotely in real time, and reports are generated automatically for each batch to confirm that appropriate pasteurization times and temperatures have been applied.

FIG. 2 is similar to FIG. 2 in the above mentioned Lara '002 patent and shows the sequential in-line movement of the batches 118A-M of stacked shell eggs in carriers 112A-M through the pasteurization bath 116. Batches of stacked eggs are dropped in the front end of the water bath 116. The level of water in the water bath is designated by the dashed line 114. The submerged batches are moved through the zones in the water bath according to predetermined time intervals, and then removed. The batches are kept in each stage in each zone for about 4-5 minutes according to the selected pasteurization protocol, which as mentioned are customized for each egg size and start temperature so that the eggs in the stack achieve at least a 5 log reduction in *Salmonella* Enteritidis without overcooking. The heating requirements for the stacks being placed into the water bath 116 are significantly greater than the stacks that are about to be removed from the water bath. The individually controlled heating coils (128A-D) located near the floor of the water bath are critical to maintaining a uniform bath temperature. An air source 120 provides pressurized air through tubing to openings 117 in the water tank 116 underneath the heating coils 128A-D, in order to agitate the water throughout and around the stacks of eggs and help maintain uniform bath temperature. FIG. 3 is similar to FIG. 3 from the Lara '002 patent and is a sectional view taken along line 3-3 in FIG. 2. FIG. 3 illustrates the use of several heating coils spanning above the floor of the pasteurizer bath. In actual commercial systems, a larger number of independently controlled heating elements, e.g. 40, are used than is shown in FIG. 3. FIG. 3 also shows temperature sensors 130A-D which are located in the vicinity of each of the heating coils 128A-D.

It is important that the pasteurizer bath and the carriers be washed periodically, for example daily or every other day. Currently, commercial in-line shell egg pasteurizers are cleaned manually. Typically, the cleaning process begins after the last batch of pasteurized eggs is removed from the bath. Empty carriers 112 are removed from the pasteurization bath and are staged on the floor next to the pasteurization bath for manual cleaning. Floating debris is also removed. When the carriers and stacks of eggs are removed from the pasteurization bath, the water level falls because the eggs and carriers consume a significant volume of the pasteurization bath. It is therefore necessary to raise the water level to near the top of the pasteurization bath for cleaning. At that point, a first cleaning agent, such as a heavy duty liquid alkaline cleaner, is added to the filled water bath. Then, the air perturbation system is turned on and the water temperature is maintained at about 120° F. while the agitated water/alkaline cleaner solution cleans the bath walls, heating coils, temperature sensors and other submerged components for about 30 minutes. The solution is then drained completely while workers rinse the walls of the water bath. Once the tank is empty, the drain is closed and workers spray the internal surfaces in the water bath with a foaming chlorinated liquid detergent. The workers also spray the carriers outside of the tank with the foaming chlorinated liquid detergent, as well as tank covers. Then, the workers scrub the tank inside and out, the covers and the carriers using scrubbing pads. The chlorinated foam is then rinsed inside the pasteurizer using a power washer. The outside of the pasteurizer, tank covers and carriers are rinsed as well using regular hose water. The equipment is sprayed with a solution of 200 ppm quaternary ammonium. Finally, the water bath is filled with water and hydrogen peroxide solution is added to a concentration of at least 200 ppm. At that point, the water in the pasteurizer is ready to be heated for production. It is desirable that the alkaline cleaner be replaced with a nitric acid solution on a weekly basis. As the pasteurizer operates, hydrogen peroxide in the water bath is deactivated. Therefore, hydrogen peroxide is added throughout the workday to ensure that the hydrogen peroxide level remains between 200 ppm and 1000 ppm. It is most desirable that the concentration of hydrogen peroxide be within the range of 250 ppm to 350 ppm; however, the amount of hydrogen peroxide necessary to maintain these levels fluctuates greatly from batch to batch. Quite often, an excessive amount of hydrogen peroxide is added unnecessarily.

The cleaning procedures discussed above are not only time consuming, but also require significant amounts of water and cleaning agents. One object of the current invention is to reduce the amount of space, water and cleaning agents needed to adequately clean an in-line, shell egg water bath pasteurization system. Another object is to automate the cleaning process, reduce the amount of time that workers need to spend cleaning the system, and reduce their physical exposure to cleaning solutions.

SUMMARY OF THE INVENTION

The invention is directed to an in-line shell egg pasteurizer having an automated or semi-automated clean-in-place system and methods of operating such a system. In accordance with the invention, the method of cleaning the shell egg pasteurizer first requires removal of all shell eggs from the pasteurizer water bath. The empty carriers are then set in the water bath for cleaning. The pasteurization water remaining in the bath is partially drained to lower the water level to a height above the height of the heating coils mounted generally above the floor of the water bath but below the height of the bottom of the empty carriers when they are set in the water bath. A first cleaning agent, such as an alkaline cleaner, is added to the heated pasteurization water remaining in the water bath. This process results with the heating coils being submerged in the first cleaning solution, but the empty carriers being located in the space above the first cleaning solution. The air perturbation system for the pasteurizer is then turned on to agitate the first cleaning solution in the water bath with the heating coils submerged. Also, a portion of the first cleaning solution is pumped from the water bath to sprayers, e.g. nozzles, spray balls or other spraying devices used for cleaning, mounted on a hood located over the open top of the water bath. The sprayers clean at least a portion of the walls of the water bath and also empty carriers that are located in the water bath in the space above the level of the first cleaning solution. Desirably, the first cleaning solution is maintained at a temperature at 120-130° F., which should require little addition of heat because the heated pasteurization water is used for the first cleaning solution. After the cleaning cycle with the first cleaning solution, the solution is drained from the water bath. A second cleaning cycle is optional. If a second cleaning cycle is used, the water bath is then filled with a second cleaning solution to a level above the height of the heating coils but below the height of the bottom of the empty carriers located in the water bath. The second cleaning solution desirably comprises a chlorinated liquid detergent. The system is then operated similarly by turning on the air perturbation system to agitate the second cleaning solution in which the heating coils are submerged, and also operates the pump to pump a portion of the second cleaning solution to the sprayers located on the hood. After the one or more cleaning cycles, the water bath is drained, rinsed if needed and then filled with clean water to a height appropriate for pasteurization of shell eggs. At that point, the system is ready to reheat the water for pasteurization.

It is desirable that the pasteurization water have a concentration of hydrogen peroxide between 200 ppm to 1000 ppm, and more desirable that the concentration level be maintained between 250 ppm and 350 ppm, as discussed above. In accordance with another aspect of the invention, the in-line pasteurizer includes an automatic feeding system for hydrogen peroxide solution which is controlled by an electronic control system. The system also desirably includes a sensor that monitors the level of hydrogen peroxide solution in the water bath and sends a signal to the electronic control system. The electronic control system controls the automatic feeding system to maintain the concentration of hydrogen peroxide in the pasteurization water throughout the pasteurization workday to a selected level, e.g., between 250 ppm to 350 ppm.

In another aspect, the invention pertains to an in-line, water bath shell egg pasteurizer having a clean-in-place system. The shell egg pasteurizer includes a water bath having a floor, two side walls and two end walls and an open top. Perturbation elements through which pressurized air is supplied to agitate the water within the water bath are located along the floor of the bath. The pasteurizer also includes a drain for the water bath, and the floor of the water bath inclines downward in the vicinity of the drain. The pasteurizer system also includes a tank recirculation outlet that is connected either to the water bath or to the drain. A plurality of heating coils are located in the water bath generally above the floor and the perturbation elements, and a plurality of empty egg carriers are set into the water bath above the heating coils. The pasteurizer further includes a drive mechanism that moves the egg carriers and, when loaded, stacks of eggs through the heated pasteurization water in the water bath. When the pasteurizer is in cleaning mode, however, the drive mechanism is turned off. The pasteurizer further includes a hood that spans over at least a portion of the open top of the water bath. Sprayers (e.g., nozzles, spray balls) are mounted on the hood to clean and/or rinse at least a portion of the walls of the water bath and any empty carriers located in the water bath. In one embodiment of the invention, the system includes an electronically controlled pump that pumps the water from the tank outlet to the sprayers mounted on the hood, and an electronically controlled water fill valve and drain valve. An electronic control system controls operation of the pump, the drain valve and the water fill valve in order to wash the water bath and empty carriers set in the water bath according to the programmed wash and optional rinse cycle.

Desirably, the pasteurizer also includes automated feed mechanisms for the cleaning agents and a programmed controller for controlling the automatic addition of metered amounts of the cleaning agents into the water bath. This feature enables the system to reliably provide the appropriate concentration of cleaning agents on an automated basis.

In addition, the pasteurizer also desirably includes an automated feed system for hydrogen peroxide into the water bath which includes a sensor to enable the system to automatically maintain the hydrogen peroxide concentration at an optimum level.

Other features and objects of the invention may be apparent to those who are of ordinary skill in the art upon reviewing the drawings and reading the following description thereof.

BRIEF DESCRIPTION OF THE DRAWINGS

FIG. 4 is a schematic view of a shell egg pasteurizer having a clean-in-place system as described in accordance with the invention.

DETAILED DESCRIPTION

Figure 1:
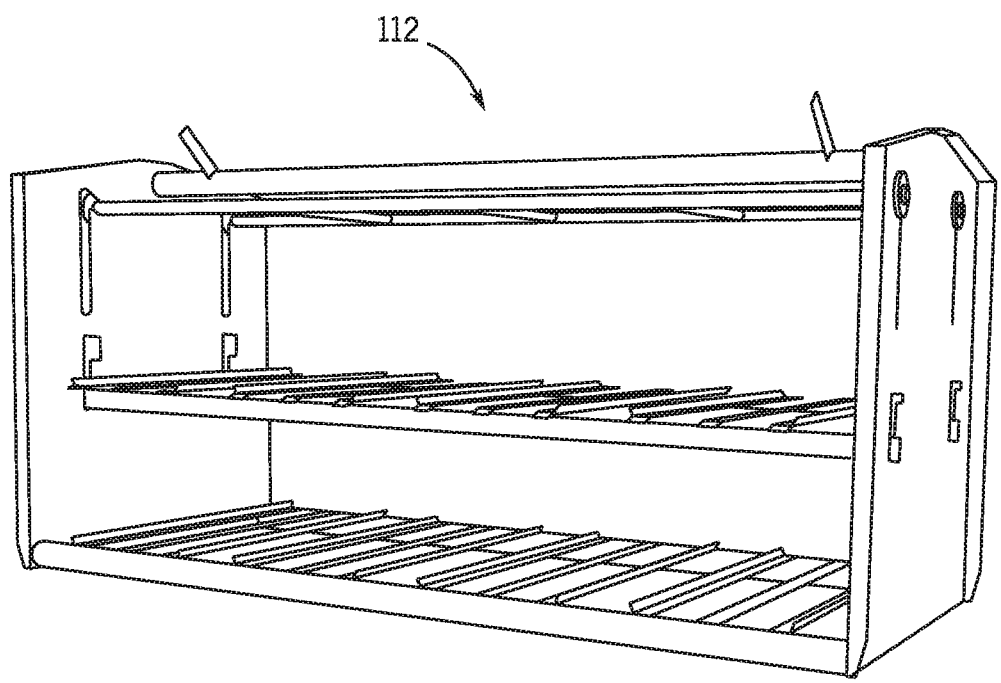
FIG. 1 is a view of an empty shell egg carrier suitable for use in the in-line shell egg pasteurizer shown in FIGS. 2 and 3.
Figure 2:
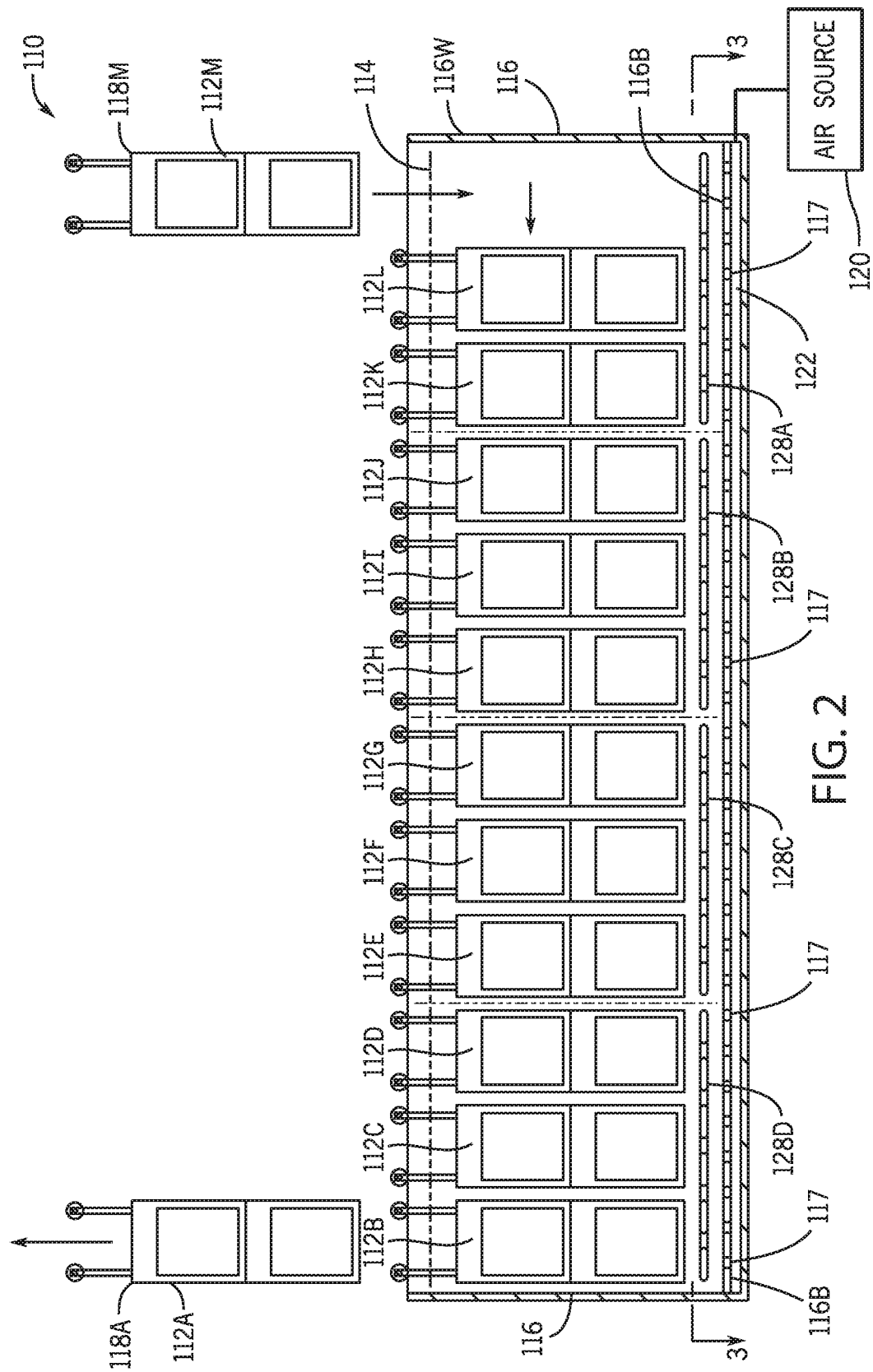
FIG. 2 is a schematic drawing showing the operation of an in-line shell egg pasteurizer as is known in the art.
Figure 3:
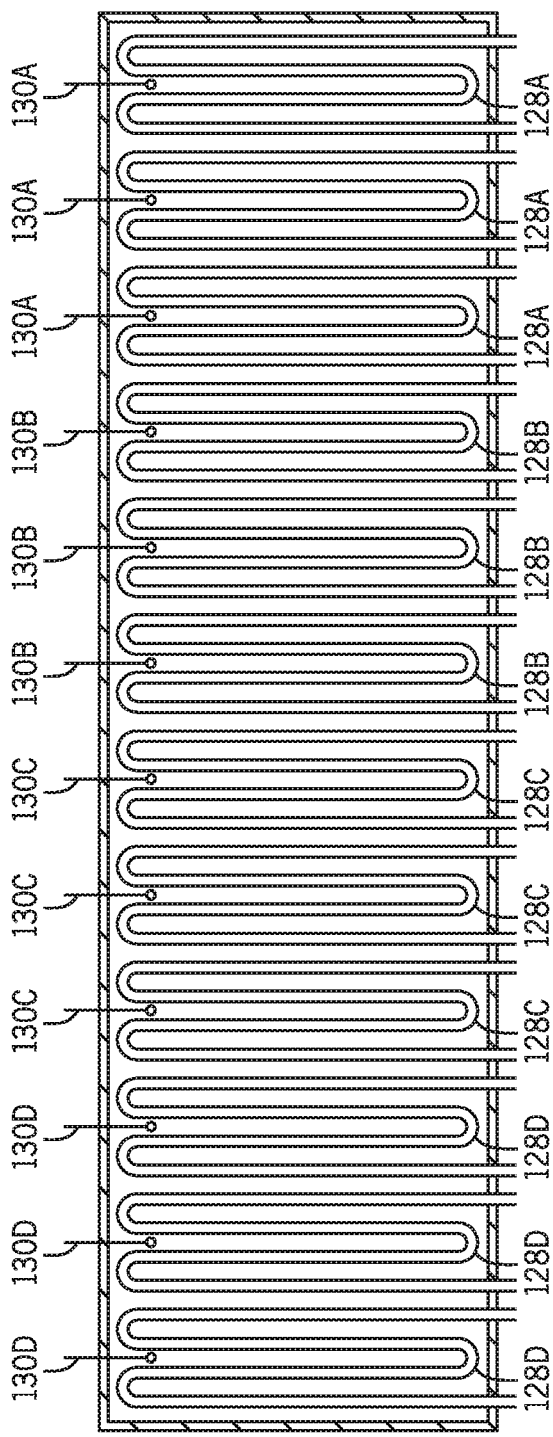
FIG. 3 is a view taken along lines 3-3 in FIG. 2.

FIG. 4 schematically illustrates a shell egg pasteurizer 210 having a clean-in-place system. Many aspects of the pasteurizer shown in FIG. 4 are similar to those schematically illustrated in the FIGS. 1 through 3, and like reference numbers are used where appropriate.

The pasteurizer 210 in FIG. 4 includes a hood 220. Hoods or covers were used in prior art systems in order to captivate steam and help to prevent debris from falling into the water bath during the pasteurization process. The hood 220 in the pasteurizer 210 shown in FIG. 4 includes a clean-in-place discharge manifold and rotating spray nozzles in order to clean the surfaces of the hood as well as the walls 116W in the pasteurizer bath and empty carriers 112A-112L placed in the pasteurizer bath 116. In order to operate the clean-in-place system, the water level in the water bath 116 is lowered to the level of dashed line 214B shown in FIG. 4. The level of the water shown by the dashed line 214B is below the level of the empty egg carriers 112A-112L that have been placed into the pasteurization tank 116, which exposes the empty egg carriers 112A-112L to spray from the spray nozzles 222 mounted on the hood 220 and also exposes the portion of the side walls 116W of the pasteurization tank located above the water level 214B. A wide variety of sprayers can be used for the clean-in-place system. For example, at least some of the sprayers can be a 360° cleaning spray ball, and other sprayers can be static nozzles or rotating sprayers. Strategic placement of the sprayers is desirable to avoid shadowing effects where the carriers inside the tank or other obstructions may block the spray from reaching a distant surface.

The pasteurization bath 116 is desirably made of stainless steel and insulated. Multiple heating coils 128 and temperature sensors 130 are located near the bottom wall 116B of the tank. The pasteurizer 210 includes a boiler loop 125 to supply heating water to the heating coils 128. The pasteurizer 210 also includes an air source 120, such as a blower, air supply plenum 119 with valve 123, and perturbation elements or tubes 122 for supplying pressurized air through openings 117 into the tank 116.

Because the hood 220 in system 210 is heavier and includes more components than in previous systems, it is desirable to provide a powered hood lift mechanism to raise the hood 220, e.g., when necessary for maintenance. The lift assembly may consist of, e.g., 4 motorized screw jacks driven by reversible motors.

Figure 5A:
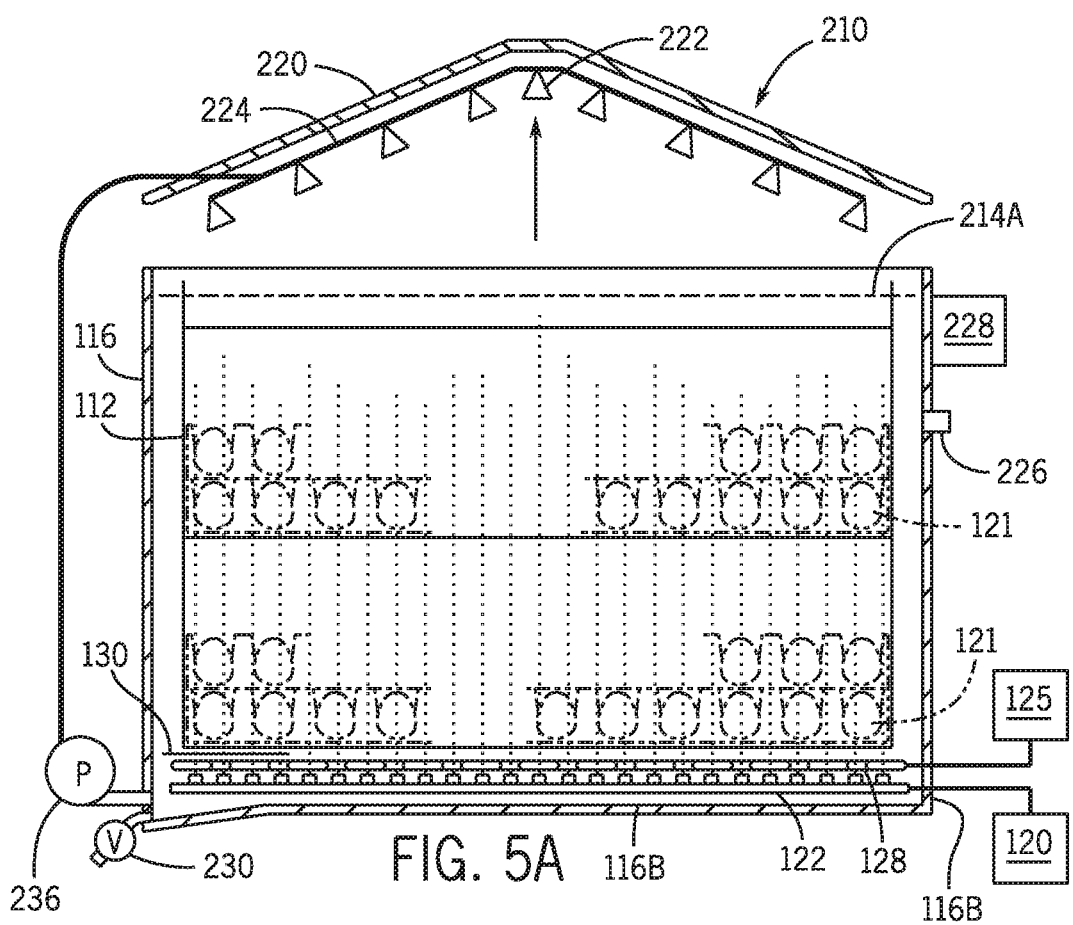
FIGS. 5A through I are schematic drawings taken along lines 5-5 in FIG. 4 showing the operation of the clean-in-place system.

FIGS. 5A through I schematically illustrate exemplary components and operation of the pasteurizer 210 with the clean-in-place system. FIG. 5A depicts a cross sectional view of the pasteurizer 210 when it is operating in pasteurization mode. The hood 220 is lowered over the top of the tank 116 in order to captivate steam and prevent loose debris from falling into the water bath. The hood 220 can include a stack (not shown) to remove excess humidity. The water level is maintained at the level designated by 214A in order that all of the eggs 121 in the carriers 112 are fully submerged. Pressurized air is supplied to perturbation elements 122 near the bottom wall 116B of the pasteurizer tank 116. The air causes the water within the tank to agitate or perturbate, which as explained above helps to maintain the temperature uniform throughout the water bath and throughout stacking eggs on the carrier. Heating coils 128 and temperature sensors 130 are also located within the tank 116 in the vicinity of the bottom wall 116B. The hood 220 in FIG. 5A also depicts sprayers 222 and piping 224. The sprayers 222 are not operational when the pasteurizer 210 is in pasteurization mode as shown in FIG. 5A. FIG. 5A schematically illustrates stacks of shell eggs 121 on carrier 112 in the bath 116.

Still referring to FIG. 5A, it is desirable that hydrogen peroxide be added to the pasteurization water and kept at a level between 200 ppm to 1,000 ppm, and preferably between 250 ppm to 350 ppm, while the water bath is being used to pasteurize eggs. FIG. 5A schematically illustrates the use of an automated system that includes a hydrogen peroxide meter 226 and an automated feed system 228 for hydrogen peroxide concentrate. Desirably, the hydrogen peroxide meter 226 measures the concentration of hydrogen peroxide in the water bath, and provides a signal to the control system which operates the hydrogen peroxide feed system 228 to maintain the hydrogen peroxide concentration level within a selected range, e.g. 250 ppm to 350 ppm. Use of an automated feed system 228 not only protects against the concentration level falling too low or becoming too high during pasteurization, but also reduces exposure to workers to hydrogen peroxide concentrate.

Figure 5B:
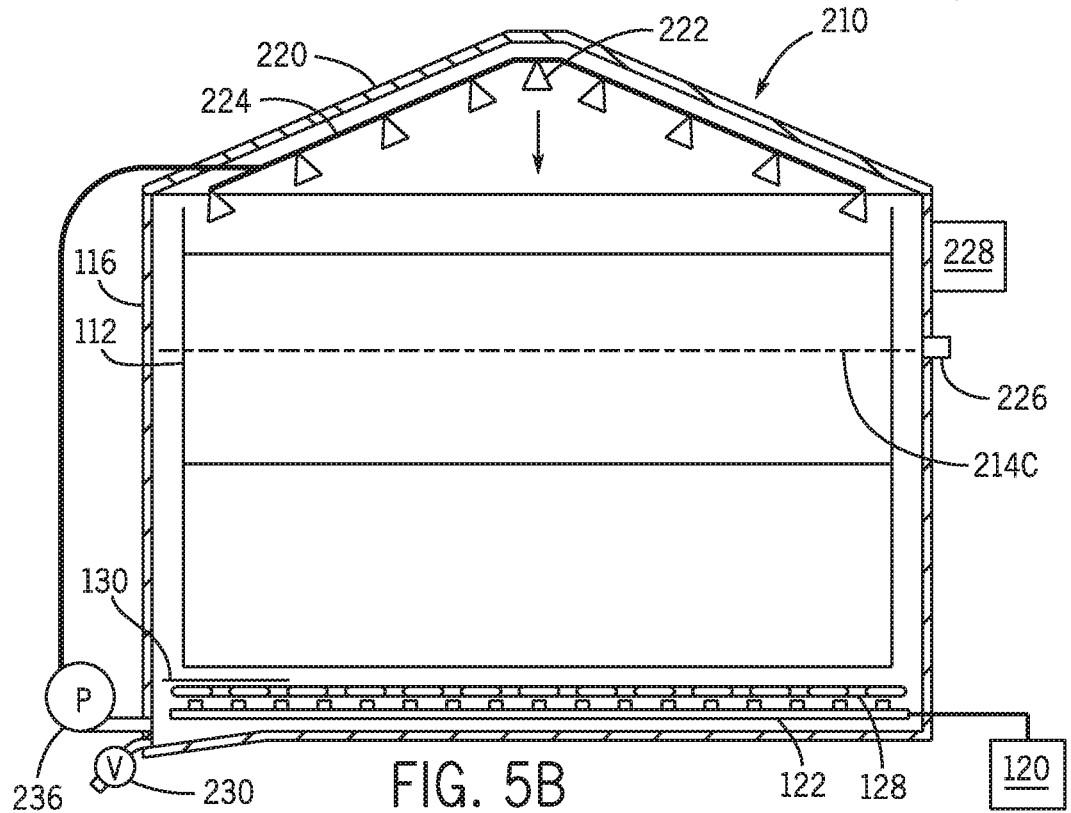

Referring to FIG. 5B, once pasteurization is complete, the first step of the clean-in-place process involves removing all of the eggs and carriers 112 from the pasteurization bath 116. The pressurized air source 120 can be turned off for this stage of the process to clean debris. Since the eggs take up volume in the water tank, the water level within the tank 116 drops to, e.g., a level shown in FIG. 5B by reference number 214C. At the level 214C shown in FIG. 5B the bottom of empty egg carriers 112 as well as the heating coils 128 and temperature sensors 130 would be submerged.

Figure 5C:
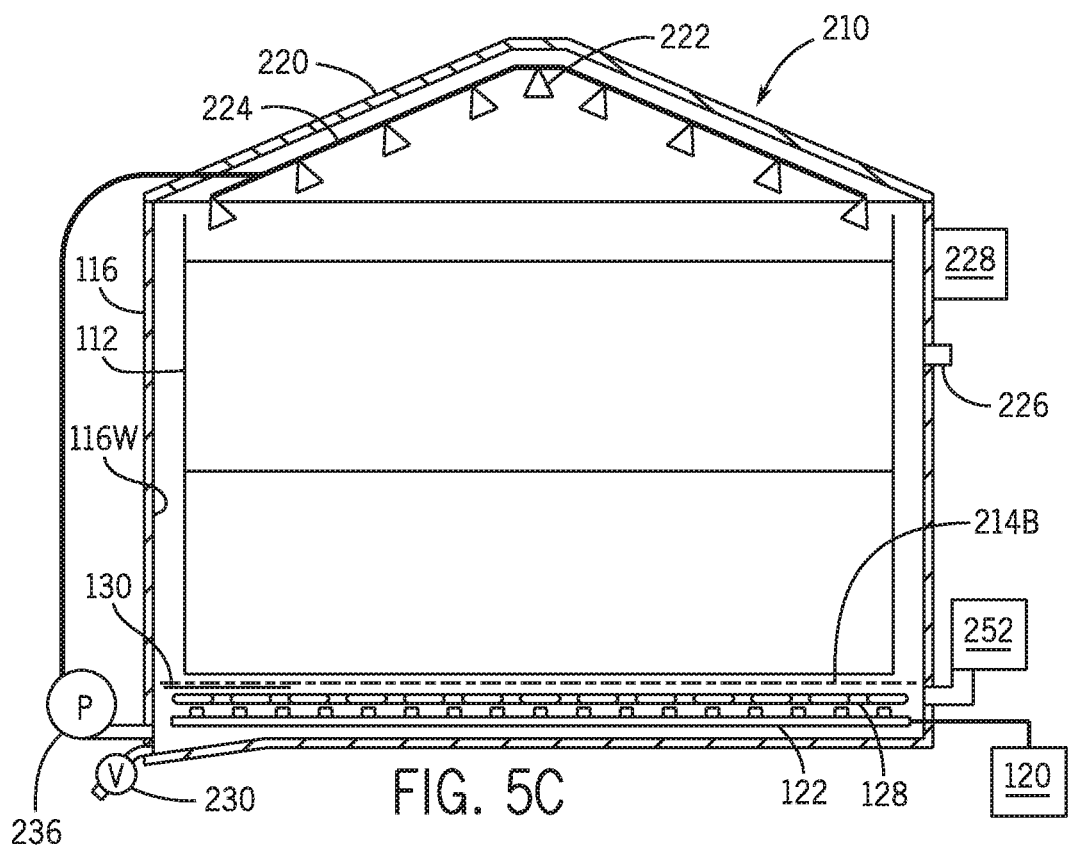

FIG. 5C shows the next stage in the clean-in-place process. In FIG. 5C, valve 230 is opened to allow water in the tank 116 to empty through a drain. The valve 230 is closed when the water level in the tank 116 reaches the level designated by reference number 214B, which is below the bottom of empty egg carriers 112 placed in the tank 116. The water level 214B, however, is still high enough so that the temperature sensors 130 and heating coils 128 remain submerged. While the temperature sensors 130 and heating coils 128 are submerged, the empty egg carriers 112 as well as the walls 116W of the tank are exposed and are able to be cleaned by cleaning solution sprayed from the sprayers 222 on the hood 220. Once the level of the water is lowered to level 214B as shown in FIG. 5C, a first cleaning agent is added to the water. FIG. 5C shows an automated feed system 252 for the first cleaning agent. While an automated feed system 252 is desirable, the invention can also be implemented through the manual addition of the cleaning agents to the water bath. The first cleaning agent should normally be a heavy duty liquid alkaline cleaner, such as one containing sodium hydroxide and sodium gluconate. Such a first cleaning solution is suitable for daily cleaning cycles. The first cleaning solution may be substituted on a periodic basis such as a weekly basis with an acidic cleaning solution e.g. one that contains nitric acid, or non-phosphated acid. With the first cleaning agent added to the pasteurization water 214B in the water bath, the system is ready to initiate the first cleaning cycle. During the cleaning cycle, empty egg carriers 112 are introduced into the water bath one by one.

Figure 5D:
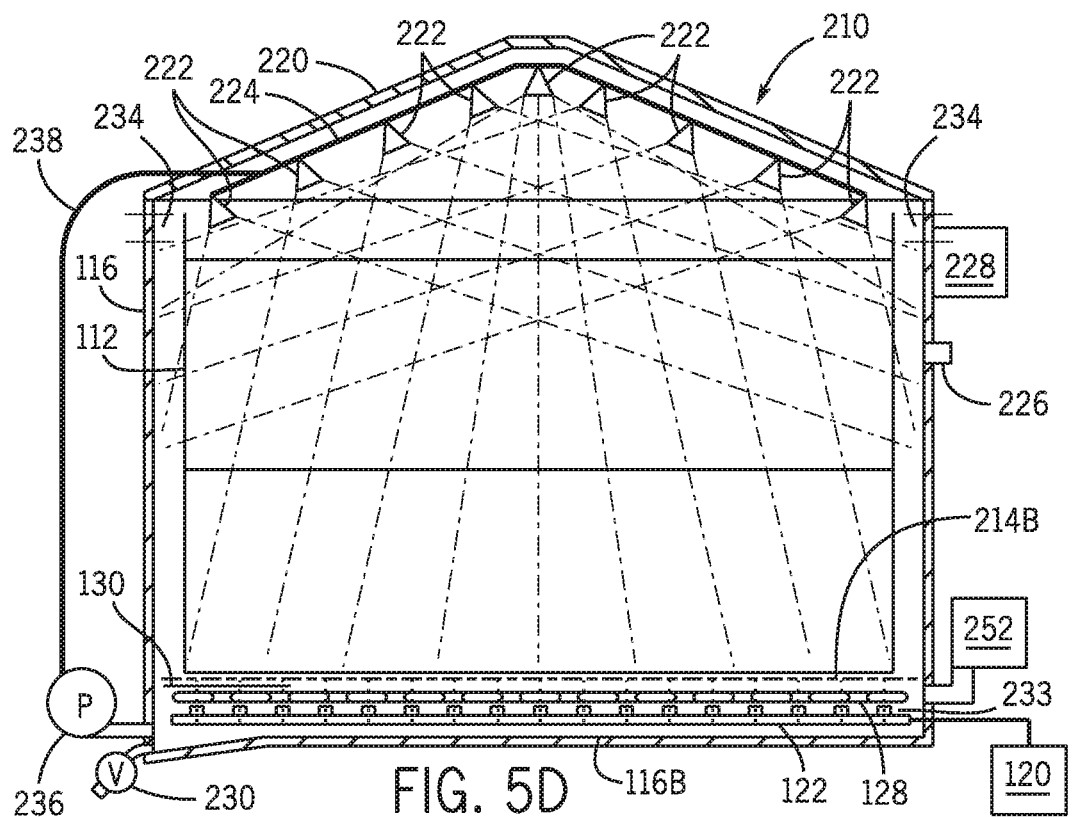

In FIG. 5D, the air source 120 is turned on to provide pressurized air through the openings 117 in the perturbation elements 122 located near the bottom wall 116B of the water bath tank 116 in order to agitate the cleaning solution 233 and clean the heating coils 128 and temperature sensors 130. Also, circulation pump 236 draws cleaning solution 233 from the bottom of the tank 116, and pumps the solution through tubing 238 to the hood 220 and the piping 224 and the sprayers 222. The circulation pump 236 should be sized to provide sufficient water pressure to operate all of the sprayers 222, although additional pump arrangements can be used in accordance with the invention. The spray pattern from the sprayers 222 is configured to reach as many exposed surfaces on the empty egg carriers 112, the hood 220, and the walls 116W of the pasteurizer as reasonably possible. In particular, the regions 234 on the pasteurizer side walls 116W are susceptible to collection of scum and grime during the pasteurization process. These regions 234 on the side walls 116W reside at the normal high water mark when the pasteurizer is in pasteurization mode, and the scum and grime tends to collect in that region 234. It is therefore important that the spray have sufficient intensity throughout the cleaning cycles to adequately clean regions 234. This can be accomplished by providing dedicated spray sprayers for various parts of the high water region 234. In the exemplary embodiment, the duration of the first cleaning cycle is in the range of 30 to 45 minutes.

Figure 5E:
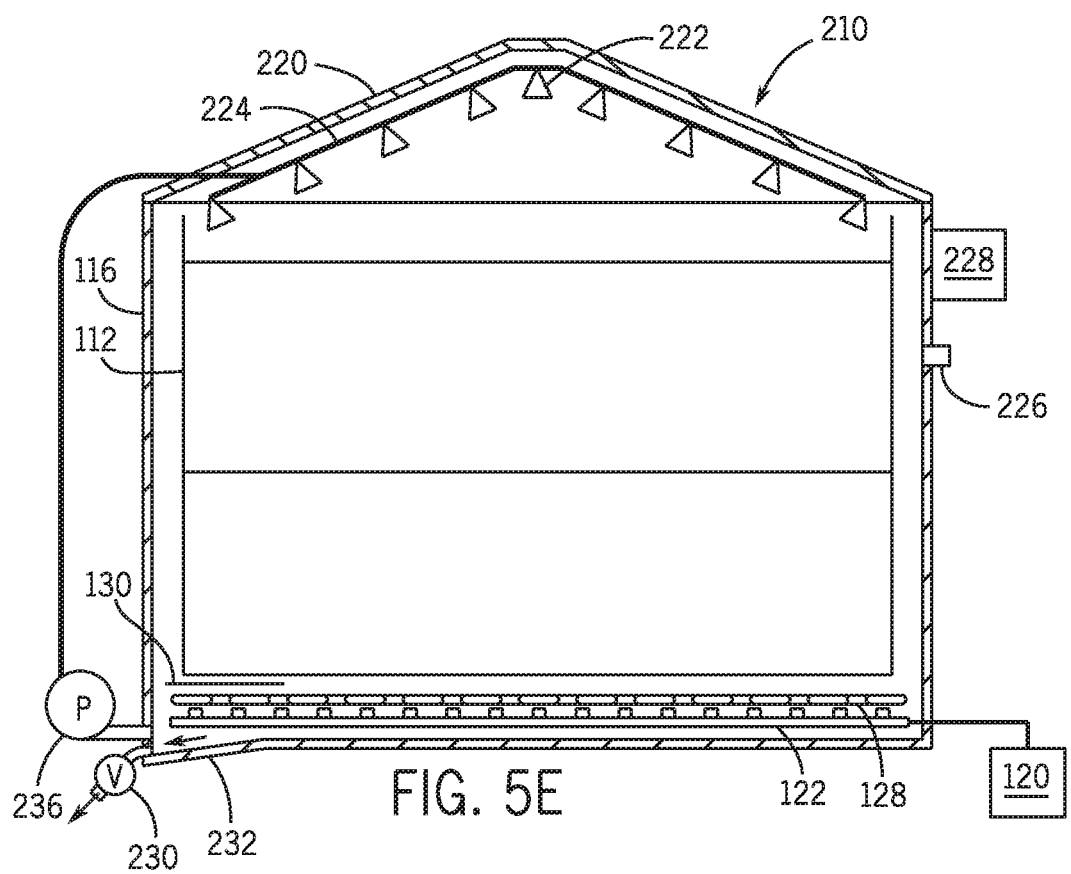

Referring to FIG. 5E, after the first cleaning cycle, the valve 230 is opened and the pasteurization bath 116 is fully emptied through a drain. An area 232 on the bottom wall 116B of the pasteurizer is slanted downward to funnel into the outlet to the drain, and ensure that virtually all of the liquid is drained from the tank via gravity when the valve 230 remains open.

Figure 5F:
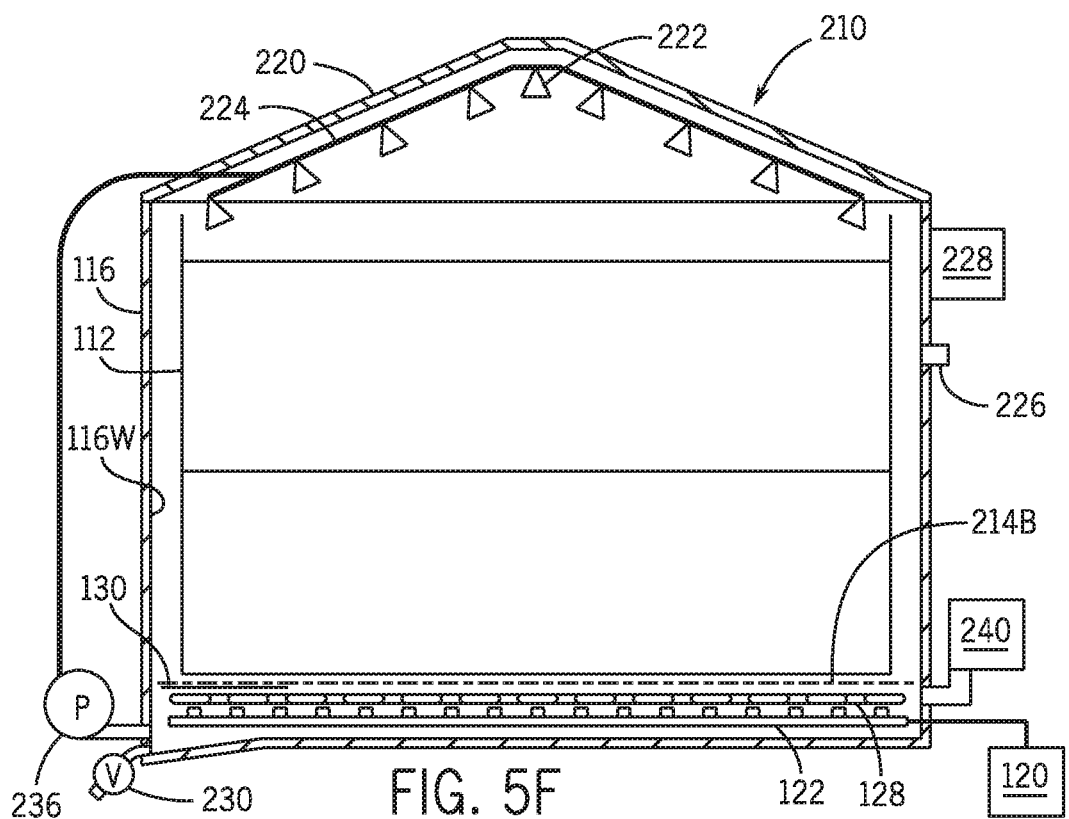
Figure 5G:
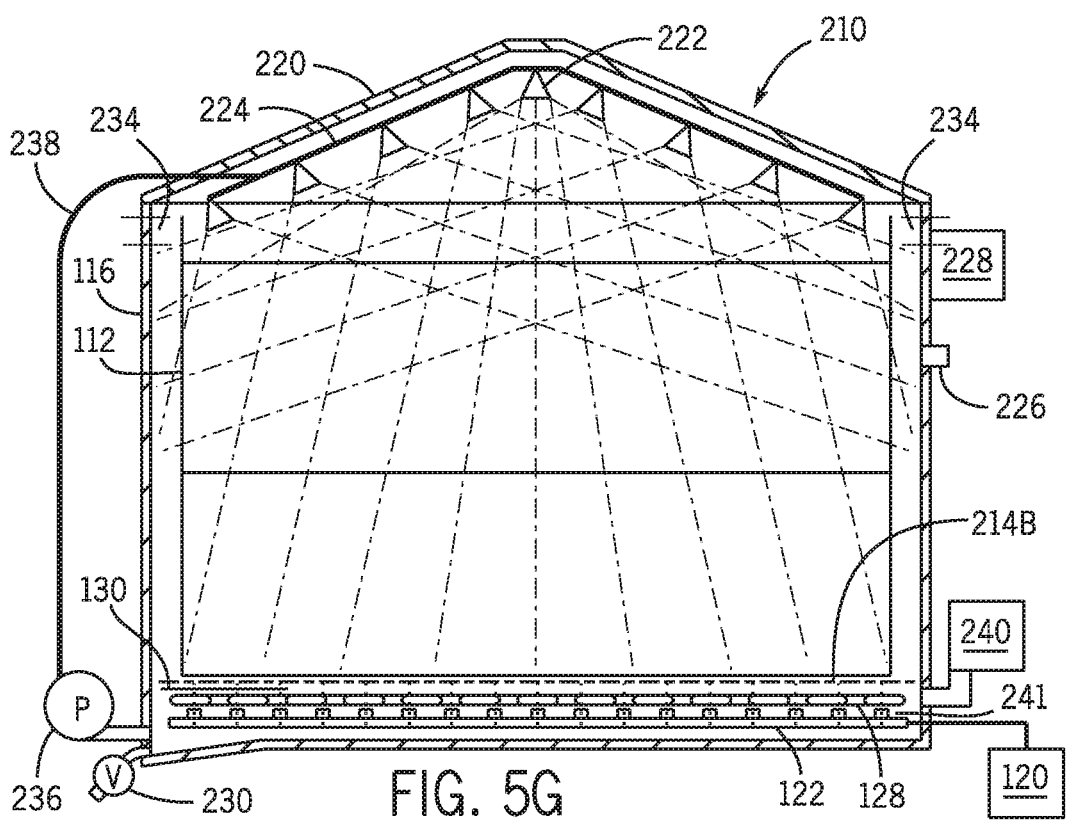
Figure 5H:
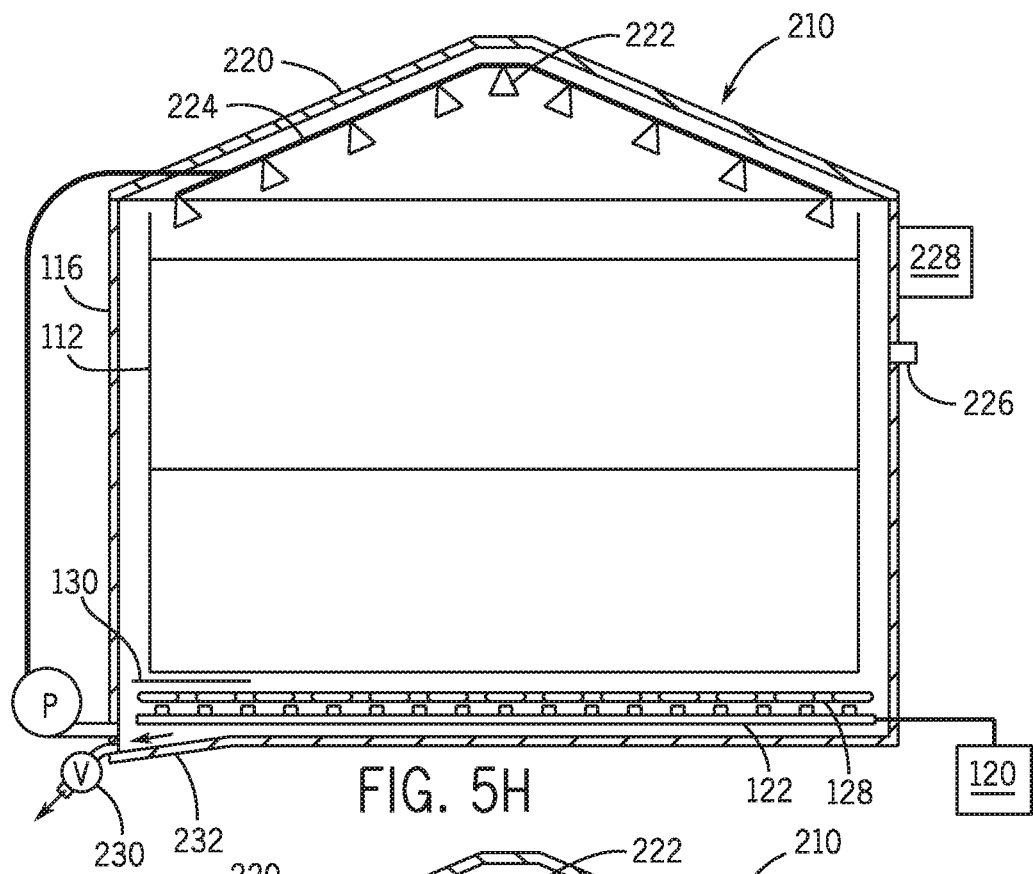

FIGS. 5F-5H show the optional second cleaning cycle. Referring to FIG. 5F, the system is filled with water again to level 214B for the second cycle of cleaning. Again, the water level 214B is set to be below the bottom of the empty egg carriers 112 yet sufficient so that the heating coils 128 and temperature sensors 130 are submerged and that the circulation pump 236 is sufficiently supplied with an adequate amount of cleaning solution. FIG. 5F shows an automated feed for the second cleaning agent 240. The second cleaning agent is desirably a chlorinated liquid detergent, for example, comprising sodium hydroxide, sodium hypochlorite and lauryldimethylamine oxide. Alternatively, the second cleaning agent can be substituted on a periodic basis with a non-phosphated liquid, acidic cleaner. Referring to FIG. 5G, once the second cleaning agent 240 is added, the circulation pump 236 pumps the second cleaning solution 241 to the sprayers 222 and the air source 120 is turned on to agitate the water near the bottom wall 214B of the pasteurization tank 116, similar to during the first cleaning cycle. The duration of the second cleaning cycle is again 30 to 45 minutes in this exemplary embodiment. Referring to FIG. 5H, after the second cleaning cycle, the second cleaning solution 241 (FIG. 5G) is fully drained, and if desired, rinsed.

Figure 5I:
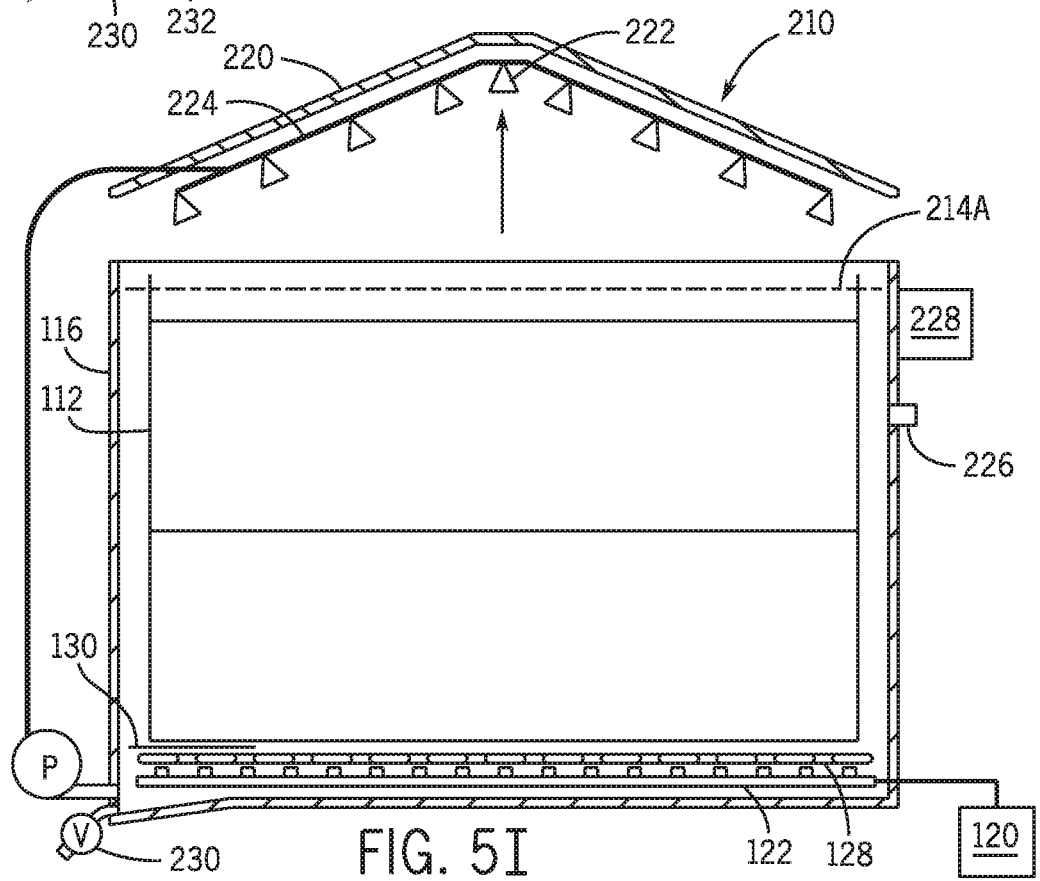

After the one or more cleaning cycles, water is added to the level 214A shown in FIG. 5I and hydrogen peroxide is added desirably to a level between 250 ppm and 350 ppm, either manually or using the hydrogen peroxide feed 228 and meter 226. The level of water in FIG. 5I is selected so that the tank will be full and the eggs and carriers 112 will be fully submerged when the first load is placed in the water bath. Note that the water level my rise toward the brim as more loads of eggs are placed in the water bath. Eventually, the water level will begin to drop as loads of eggs are removed from the water bath. Make-up water and/or cooling water is added periodically throughout the workday to maintain the water level above the level of the batches of eggs.

FIGS. 5A and 5I illustrate the hood 220 being slightly raised over the open top of the pasteurization tank 116 during pasteurization, whereas FIGS. 5B through 5H depict the system 210 during the cleaning cycles with the hood 220 placed down on the walls of the pasteurization tank 116. In practice, the hood 220 can be lowered during the pasteurization process as well. A flexible water feed hose 237 is used between the circulation pump 236 and the piping 224 in the hood 220.

Figure 6:
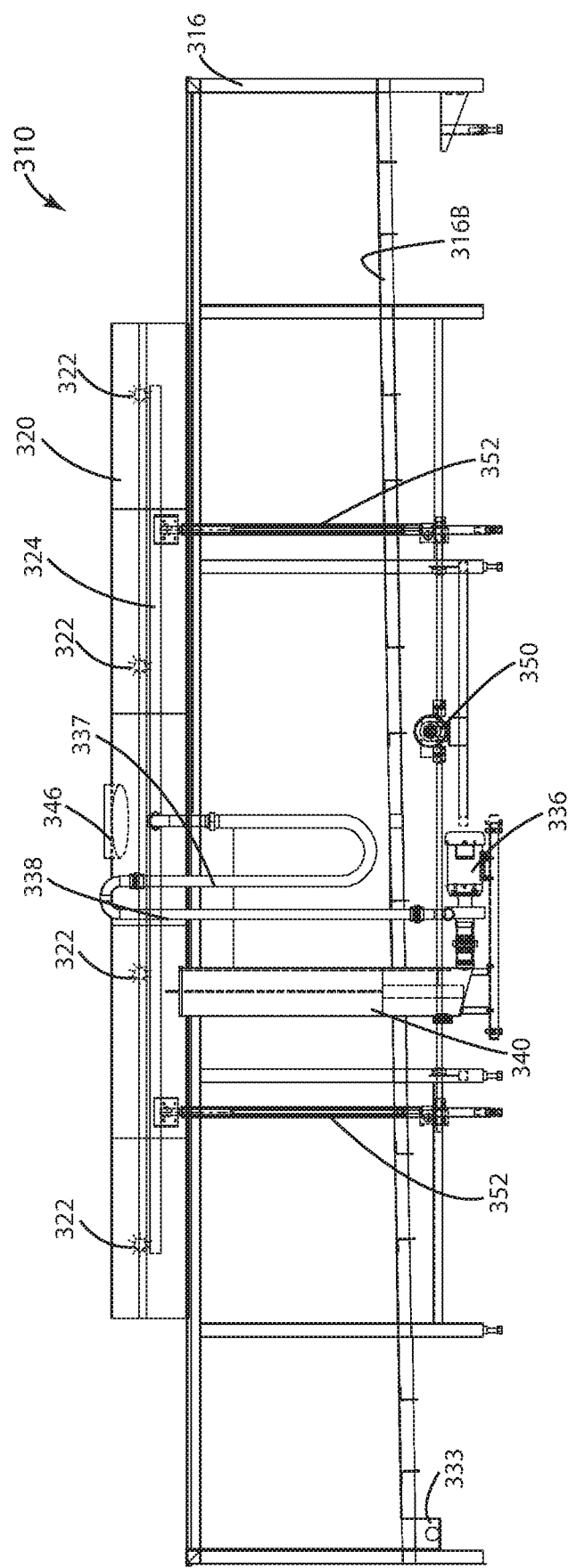
FIG. 6 is a side elevation view of an in-line, shell egg water bath pasteurizer having a clean-in-place system constructed in accordance with an exemplary embodiment of the invention.
Figure 7:
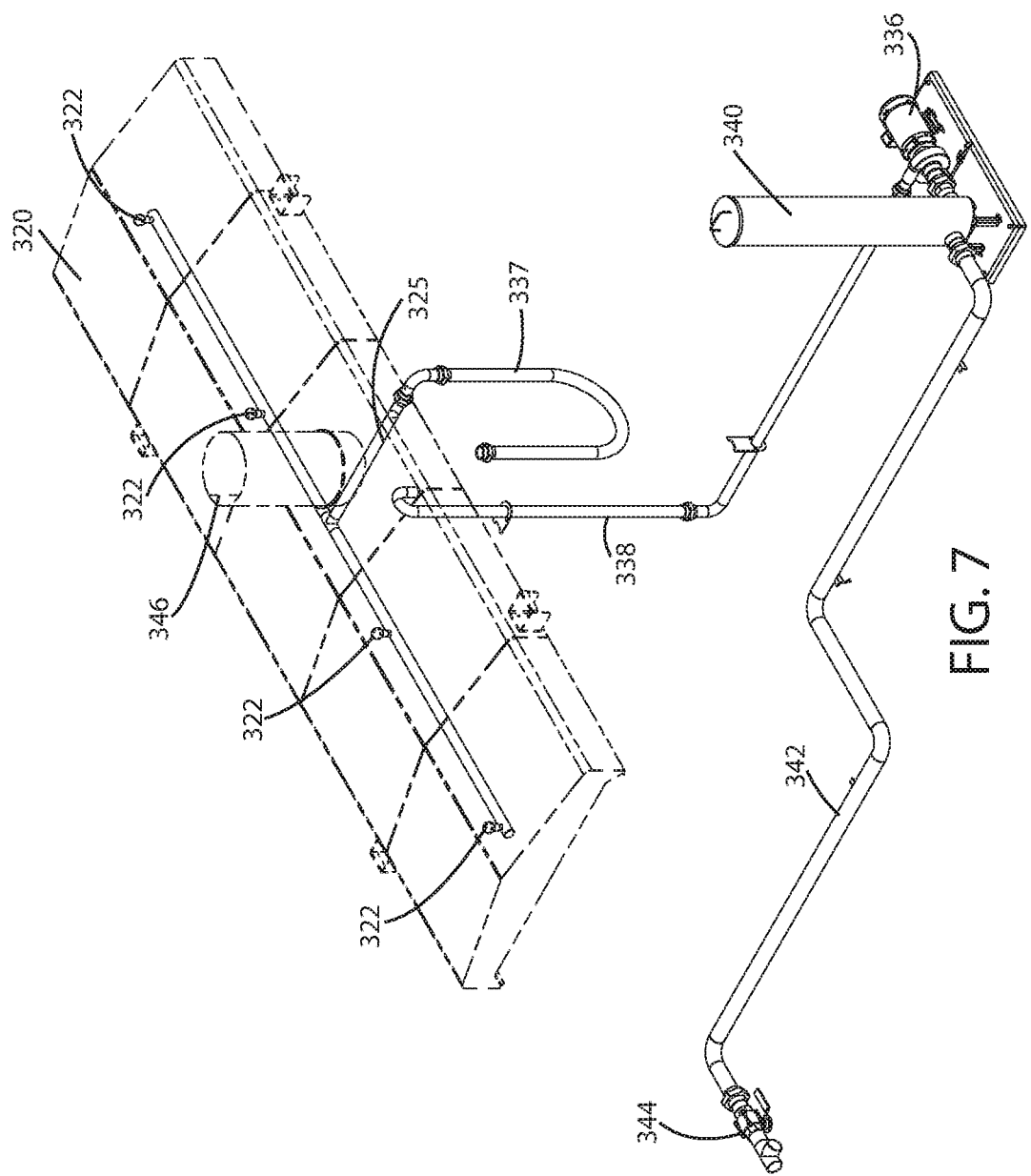
FIG. 7 is a perspective view of components of the clean-in-place system shown in FIG. 6.
Figure 8:
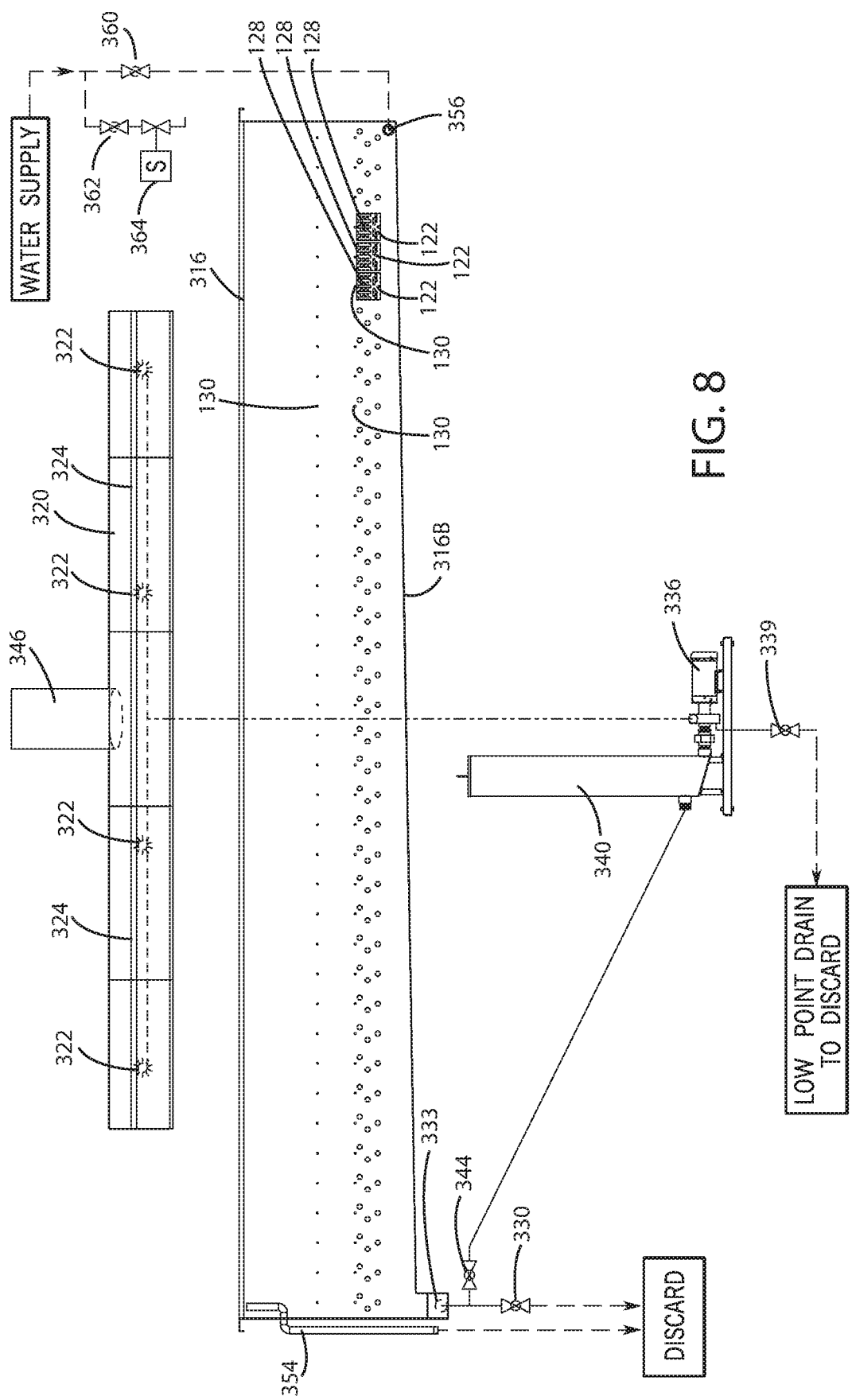
FIG. 8 is a schematic view illustrating the operation of selected components of the clean-in-place system shown in FIGS. 6 and 7.

FIGS. 6 through 8 illustrate an in-line, shell egg water bath pasteurizer 310 having a clean-in-place system constructed in accordance with an exemplary embodiment of the invention. The water bath 316 includes a bottom wall 316B that is inclined downward toward a drain outlet 33 for the tank. A fill receptacle 356, FIG. 8, is located at the other end of the water bath 316 to fill the bath 316 with water prior to start up, or for a second cleaning cycle or a rinse. Referring to FIG. 8 in particular, a representation of heating elements 128 and perturbation elements 122 are shown installed above the bottom wall 316B of the water bath 316. While only three sets of elements 128, 122 are shown in FIG. 8, the system in practice has these elements 128, 122 extending along the entire length of the water bath 316. Temperature sensors 130 are mounted in the vicinity of the heating elements 128 and also higher along the side wall of the water bath 316.

Referring again generally to FIGS. 6 through 8, the clean-in-place system includes a hood 320 with a stack 346 to allow humidity to escape while the pasteurizer 310 is operating to pasteurize shell eggs. The hood 320 also includes a clean-in-place discharge manifold 324 with sprayers 322 attached. In this embodiment, the manifold 324 extends along the longitudinal apex on the inside surface of the hood 320. The exemplary sprayers 322 are 360 degree, cleaning spray balls, 48 GPM @ 1 Bar. The hood 320 is placed in the down position as shown in FIG. 6 when the clean-in-place system is used. A motor 350 drives a lift mechanism 352 to raise and lower the hood 320.

The manifold 324 receives pressurized water and/or cleaning solution from the recirculation pump 336. The supply line to the manifold 324 includes pipe 338 from the outlet of the recirculation pump 326, and flexible hose 337 extending between the pipe 338 and the inlet pipe 325 for the manifold 324. The flexible hose 337 is needed because the hood 320 is raised and lowered over the course of normal operation and maintenance work. The recirculation pump 336 receives water and/or cleaning solution from a return pipe 342 after the water and/or cleaning solution filters through a strainer 340. Valve 344 in the return pipe 342 controls whether recirculated water and/or cleaning solution is supplied to the recirculation pump 236. Valve 330 is opened to discard waste water and/or cleaning solution. Valves 330 and 344 can be electronically controlled to automate or semi-automate the clean-in-place process. Valve 339 is provided in a drain line from the recirculation pump 236 to allow the clean-in-place system to fully drain when not in use. Referring again to FIG. 8, a valve 360 is opened to fill the water bath 316 with water via the fill receptacle 356. FIG. 8 also shows a manual valve 362 and a solenoid actuated valve 364 which provides another way for the system 310 to add water to the water bath 316. Although not pertinent to the present invention, the solenoid actuated valve 364 is normally controlled by a PID controller to help maintain the appropriate bath water temperature during pasteurization. During operation of the clean-in-place system, normally valve 362 would remain closed and filling will occur using only the filling receptacle 356. On the other hand, it is possible to open valves 362 and 364 during the filling process if desired to speed up the filling process. Valves 360 and 362 can be electronically controlled as well to automated or semi-automate the clean-in-place process. In addition, FIG. 8 shows an overflow drain 354 for the water bath 316, which discards water from the bath 316 in the event that the water level rises too high.

The exemplary clean-in-place system shown in FIGS. 6 through 8 can be operated as described above in connection with FIGS. 5A-I, without or without the optional second cleaning cycle. In addition, it should be apparent to those skilled in the art that the exemplary clean-in-place system shown in FIGS. 6 through 8 does not include all of the features described previously in connection FIGS. 5A-I, but could be modified to include those other features as well.

What is claimed is:

1. A shell egg pasteurizer system comprising:
   a water bath having a floor, two side walls and two end walls;
   a drain for the water bath, wherein the floor of the water bath inclines downward towards the drain in the vicinity of the drain;
   a tank recirculation outlet connected to the water bath or the drain;
   a plurality of heating coils located in the water bath above the floor, wherein the heating coils are configured to heat liquid in the water bath to a pasteurizing temperature during pasteurization of shell eggs;
   a plurality of empty egg carriers set in the water bath above the heating coils;
   perturbation elements located underneath the heating coils;
   a blower that supplies pressurized air to the perturbation elements, wherein the perturbation elements are configured to discharge pressurized air upwards towards egg carriers during pasteurization of shell eggs;
   a hood spanning over at least a portion of an open top of the water bath; and
   sprayers mounted to the hood to clean or rinse at least a portion of walls of the water bath and the empty egg carriers located in the water bath, wherein a pump connects the tank recirculation outlet to the sprayers.

2. A system as recited in claim 1, wherein the pump is an electronically controlled pump that pumps water from the tank recirculation outlet to the sprayers mounted to the hood, and wherein the system further comprises:
   an electronically controlled drain valve;
   an electronically controlled water fill valve; and
   wherein the drain, the electronically controlled pump, and the electronically controlled water fill valve are configured to wash the water bath and the empty carriers set in the water bath and to fill the water bath with liquid to a height for pasteurization of shell eggs.

3. A system as recited in claim 1, wherein the system is configured to feed metered amounts of cleaning agents into the water bath in an automated manner.

4. A system as recited in claim 1, wherein the system is configured to monitor a concentration of hydrogen peroxide in the water bath as the pasteurizer operates, and wherein the system is configured to add hydrogen peroxide to the water bath in order to maintain a water bath concentration of hydrogen peroxide between 250 ppm and 350 ppm.

5. A system as recited in claim 1 wherein a discharged spray pattern of liquid ejected from the sprayers overlaps with a first height of the water bath, wherein the first height is a height of water in the water bath during pasteurization of shell eggs.

* * * * *